United States Patent
Gao et al.

(10) Patent No.: US 7,860,971 B2
(45) Date of Patent: Dec. 28, 2010

(54) ANTI-SPAM TOOL FOR BROWSER

(75) Inventors: Bin Gao, Beijing (CN); Tie-Yan Liu, Beijing (CN); Hang Li, Beijing (CN); Lei Yang, Guangyuan (CN)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/035,124

(22) Filed: Feb. 21, 2008

(65) Prior Publication Data
US 2009/0216868 A1     Aug. 27, 2009

(51) Int. Cl.
*G06F 15/16*     (2006.01)
(52) U.S. Cl. ...................................... 709/225
(58) Field of Classification Search ............. 709/225, 709/223
See application file for complete search history.

(56) References Cited

U.S. PATENT DOCUMENTS

| | | | |
|---|---|---|---|
| 2005/0060643 A1* | 3/2005 | Glass et al. ............. | 715/501.1 |
| 2006/0026242 A1* | 2/2006 | Kuhlmann et al. .......... | 709/206 |
| 2006/0136420 A1 | 6/2006 | Gandhi et al. | |
| 2006/0253458 A1 | 11/2006 | Dixon et al. | |
| 2007/0027992 A1 | 2/2007 | Judge et al. | |
| 2007/0039038 A1 | 2/2007 | Goodman et al. | |
| 2007/0094500 A1 | 4/2007 | Shannon et al. | |
| 2007/0118898 A1 | 5/2007 | Morgan et al. | |
| 2007/0130327 A1 | 6/2007 | Kuo et al. | |
| 2007/0192855 A1 | 8/2007 | Hulten et al. | |
| 2008/0077995 A1* | 3/2008 | Curnyn ........................ | 726/27 |

FOREIGN PATENT DOCUMENTS

WO    WO2007016868 A2    2/2007
WO    WO2007096659 A1    8/2007

OTHER PUBLICATIONS

Green, "How URL Spam Filtering Beats Bayesian/Heuristics Hands Down", found at <<http://www.spamstopshere.com/download/ssh_url_filtering_white_paper.pdf>>, Greenview Data, Inc., 2005, 10 pgs.
McMillan, "Free E-Mail Toolbar Searches for Spam", found at <<http://www.computerworld.com/securitytopics/security/story/0,10801,109456,00.html?source=x73>>, Computerworld, Inc., 2007, 3 pgs.
"Say Goodbye to Spam, Phishing and Viruses", found at <<http://www.cloudmark.com/desktop/howitworks/>>, Cloudmark, Inc., 2007, 2 pgs.

* cited by examiner

*Primary Examiner*—Wing F Chan
*Assistant Examiner*—Andrew Woo
(74) *Attorney, Agent, or Firm*—Lee & Hayes, PLLC

(57) ABSTRACT

An anti-spam tool works with a web browser to detect spam webpages locally on a client machine. The anti-spam tool can be implemented either as a plug-in module or an integral part of the browser, and manifested as a toolbar. The tool can perform an anti-spam action whenever a webpage is accessed through the browser, and does not require direct involvement of a search engine. A spam detection module installed on the computing device determines whether a webpage being accessed or whether a link contained in the webpage being accessed is spam, by comparing the URL of the webpage or the link with a spam list. The spam list can be downloaded from a remote search engine server, stored locally and updated from time to time. A two-level indexing technique is also introduced to improve the efficiency of the anti-spam tool's use of the spam list.

16 Claims, 6 Drawing Sheets

ANTI-SPAM TOOL FOR BROWSER

BACKGROUND

As more and more people rely on the wealth of online information, increased exposure on the Web may yield significant financial gains for individuals or organizations. Growing with the increasing significance of Web presence is the practice of Web spamming. In general, Web spamming may be broadly defined as actions intended to acquire or assert a presence on the web which is either undeserved by the webpage or undesired by the viewer. Web spamming is a serious problem for Web users because the users may not be aware of the spamming practice and tend to trust the result of a search based on a general reputation of the search engine used.

One significant category of Web spamming includes actions intended to mislead search engines into ranking some webpages higher than they deserved. Because rank promotion in the result of Web search engines can be gained by spamming techniques and can be translated to revenue or interest, web spam targeting search engines has become more and more widespread in today's web engineering, and has become one of the greatest challenges for search engines.

Although search engines use many techniques to combat with web spam, they can only remove the detected spam pages from a search results returned to a user who has performed a search using a search engine. Users still have many chances to come across spam pages even if they do not reach these pages through a search engine. For example, a user may come to a spam page by following a link contained in a previously visited webpage, or by following a link contained in an e-mail message or a document. The user may also directly go to a website by entering a URL in a web browser. Under such circumstances, existing anti-spam technologies centered around search engines may not be helpful to a user who is not accessing the website through a search engine.

SUMMARY

This disclosure describes an anti-spam tool that works with a web browser to detect spam webpages locally on a client machine. The anti-spam tool can be implemented either as a plug-in module installed on the web browser, or an integral part of the web browser, and can be manifested as a toolbar on the browser. The anti-spam tool may perform an anti-spam action whenever a webpage is accessed through the web browser, and may not require direct involvement of a search engine for the anti-spam to be effective. The anti-spam tool has a spam detection module installed on the client machine (typically a computing device) to determine whether a webpage being accessed is spam by comparing the URL of the webpage with a spam list. The spam detection module may also detect whether a hyperlink contained in the webpage is spam by comparing the URL of the link with the spam list. The spam list can be downloaded from a remote search engine server, stored locally and updated from time to time.

This disclosure also introduces a two-level indexing technique used to improve the efficiency of the anti-spam tool's use of the spam list. In one embodiment, the anti-spam tool computes a hash value for each spam URL of the spam list, sorts the spam URLs by their computed hash values, and then divides the spam list into multiple sub chunks of spam URLs. Each sub chunk has a sequential range of hash values defined by a lower bound and an upper bound. Anti-spam tool maps the sequential ranges of the hash values for the sub chunks to a first level index, and maps the spam URLs of each sub chunk to a second level index. To determine whether a webpage is spam, the anti-spam tool matches the hash value of the URL of the webpage with the hash values of the spam URLs of the spam list through the first level index followed by the second level index. During execution, the first level index may be loaded to a memory of the computing device to realize fast matching.

Various anti-spam actions may be performed, including for example blocking access by the web browser to the webpage, displaying a warning against access to the webpage, highlighting a link to the webpage, and removing any links to the webpage from a parent webpage that is being opened by the web browser. The anti-spam tool may also have a user interface adapted to receive a user feedback containing spam report information, which can be used to update either the local spam list, or search engine's spam list hosted on the remote server shared by many users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Disclosed is an anti-spam tool, which in one embodiment can be implemented as a toolbar for the web browser such as Internet Explorer. The anti-spam tool does not require a user to perform a web search in order to enjoy the benefit of the anti-spam tool, but can be configured to take advantage of the anti-spam lists compiled by search engines using modern anti-spam technologies. In return, the anti-spam tool may also enable users to contribute to the search engine anti-spam lists through a feedback mechanism.

Usually, a search engine uses many anti-spam techniques to detect spam pages, and thus will have accumulated a big list of these spam pages. The anti-spam tool can benefit from this spam list and help users detect and remove the spam sites. When a user opens a webpage in the browser, for example, the anti-spam tool automatically captures the content of the webpage and analyzes its URL and all the hyperlinks contained in the webpage to verify whether these URLs are found in the big spam list generated by the search engine. If the page that is being opened is spam, the anti-spam tool takes an anti-spam action, such as sending an alert message to the user. If there are spam URLs in the page being opened, the anti-spam tool can highlight or remove the links to spam URLs so that the user would not click on the links. Furthermore, the tool can be equipped with a feedback function for users to report the spam pages they find to the search engine. With the help of the anti-spam tool, the surfing experience of the users may be improved.

Figure 1:
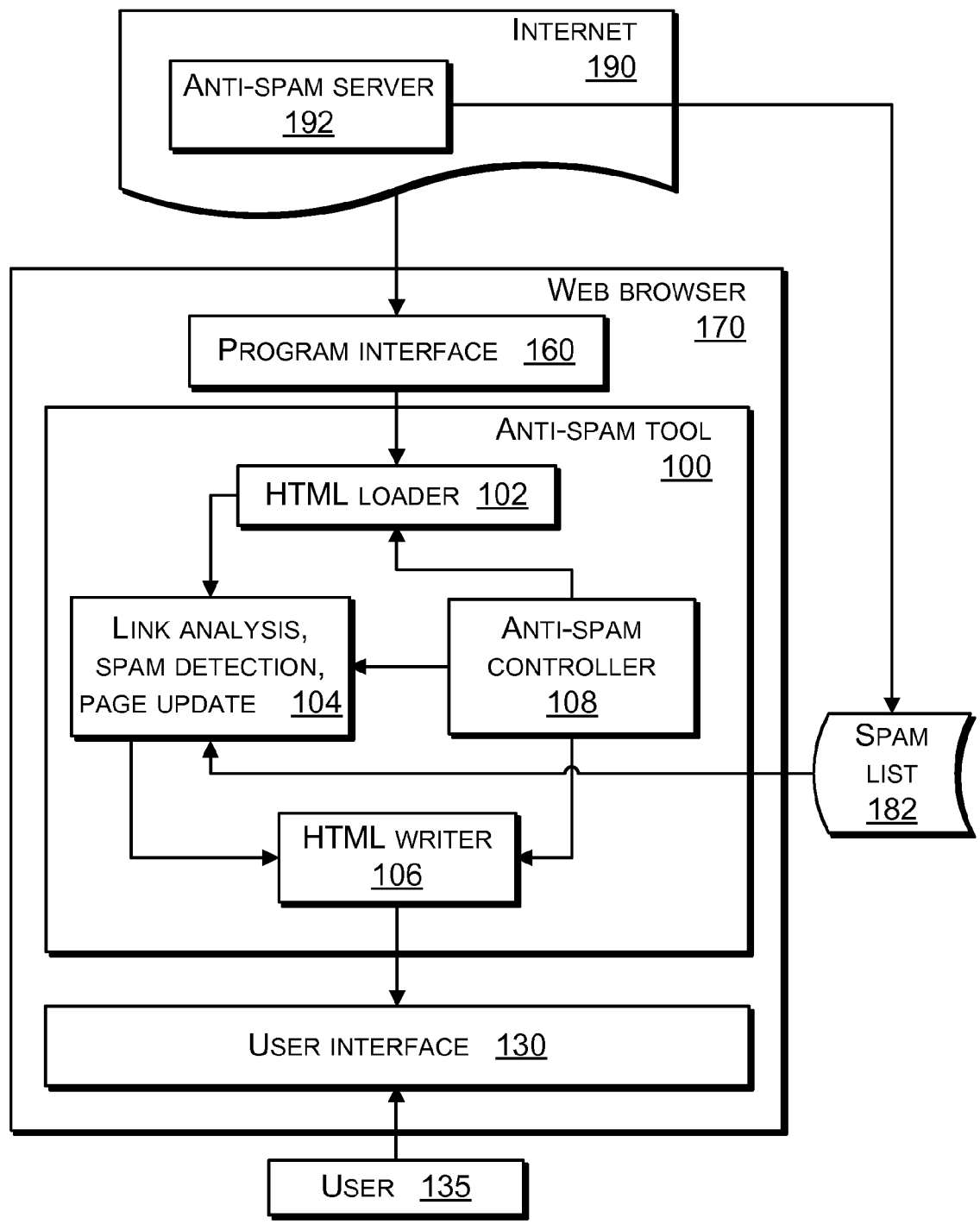
FIG. 1 illustrates an exemplary embodiment of the anti-spam tool disclosed herein.

FIG. 1 illustrates an exemplary embodiment of the anti-spam tool disclosed herein. Anti-spam tool 100 is implemented in web browser 170, either as an integral part thereof, or a plug-in component. Anti-spam tool 100 interacts with web browser 170 through program interface 160, which can be a component of an API such as a Component Object Model (COM) interface. The COM interface is a platform for software componentry used to enable interprocess communication and dynamic object creation in any programming language that supports the compatible technology. The COM interface is part of Windows API designed to access the components of Internet Explorer. Other types of programming interfaces may be used in place of the COM interface as program interface 160, especially when web browser 170 is an alternative to Internet Explorer.

Anti-spam tool 100 includes the following components: HTML loader 102 which calls functions in program interface 160 to load a webpage into web browser 170; anti-spam operation unit 104 which has several modules to perform anti-spam functions such as link analysis, spam detection and page update; anti-spam controller 108 which is the central controlling component of anti-spam tool 100; and HTML writer 106 which writes a webpage to be displayed by web browser 170.

Anti-spam operation unit 104 may have separate modules to perform individual anti-spam functions such as link analysis, spam detection and page update. For example, a link analysis module extracts links from a newly loaded webpage; a spam detection module detects spam links from the extracted links by matching them with the URLs in the spam list 180; and a page update module generates a version of the loaded page to reflect an anti-spam action taken by anti-spam controller 108 based on the results of link analysis and spam detection. Depending on the anti-spam action taken and user requirement, the page update module may generate several different versions of the loaded page, including (a) the original version; (b) a modified version by highlighting the detected spam URLs; and (c) a modified version by deleting the detected spam URLs.

HTML writer 106 receives the output webpage from anti-spam operation unit 104, and outputs the webpage through user interface 130 to user 135. The output page from anti-spam operation unit 104 may be an updated webpage generated by page update module in anti-spam operation unit 104. User interface 130 is part of web browser 170 and can be a normal graphic user interface used by web browser 170. As will be shown later, user interface 130 may also be used to receive user feedback, such as reporting newly found spam by users, and to perform other user interactive functions. To write a webpage into user interface 130 of web browser 170, HTML writer 106 may call functions in program interface 160, either directly or through anti-spam controller 108.

Spam list 182 contains a large list of spam URLs, typically supplied by a search engine through a server such as anti-spam server 192. Spam list 182 can be generated by spam detectors of the search engine, and may typically contain millions of URLs. It is possible for anti-spam tool 100 to directly access a network spam list hosted by the search engine (e.g., by remotely accessing anti-spam server 192 through Internet 190). However, in a preferred embodiment, the spam list 182 is first downloaded from anti-spam server 192, stored at a storage more easily accessible by anti-spam tool 100. The storage may be a network storage positioned on the same LAN as that of the computing device hosting web browser 170 and anti-spam tool 100, but may also be a local storage hosted by the computing device. As will be illustrated further below, a spam list indexer may be used to index spam list 182 to further improve performance.

Figure 2:
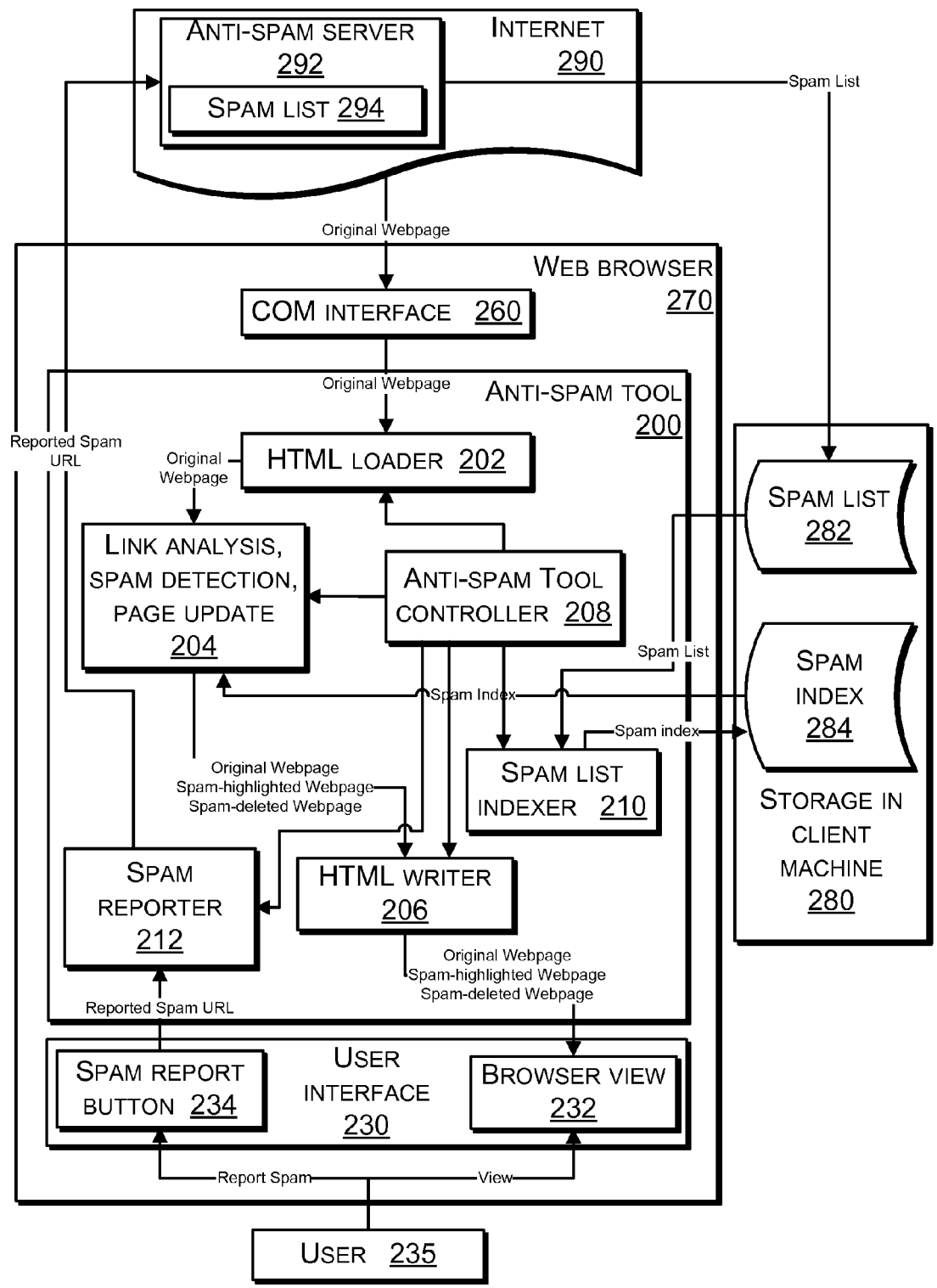
FIG. 2 illustrates a second exemplary embodiment of the anti-spam tool disclosed herein.

FIG. 2 illustrates a second exemplary embodiment of the anti-spam tool disclosed herein. Anti-spam tool 200 has a basic configuration similar to that of anti-spam tool 100 of FIG. 1, but shows several additional features such as spam list indexing and spam report feedback. Anti-spam tool 200 is implemented in web browser 270, either as an integral part thereof, or a plug-in component. Anti-spam tool 200 interacts with web browser 270 through program interface 260, which can be a component of an API such as a Component Object Model (COM) interface. Other types of programming interfaces may be used in place of the COM interface as program interface 260, especially when web browser 270 is an alternative to Internet Explorer.

Anti-spam tool 200 includes the following basic components that are similar to the components in anti-spam tool 100: HTML loader 202 which calls functions in program interface 260 to load a webpage into web browser 270; anti-spam operation unit 204 which has several modules to perform anti-spam functions such as link analysis, spam detection and page update; anti-spam controller 208 which is the central controlling component of anti-spam tool 200; and HTML writer 206 which writes a webpage to be displayed by web browser 270. Anti-spam operation unit 204 may have separate modules to perform individual anti-spam functions such as link analysis, spam detection and page update. HTML writer 206 receives the output webpage from anti-spam operation unit 204, and outputs the webpage through user interface 230 to user 235. To write a webpage into user interface 230 of web browser 270, HTML writer 206 may call functions in program interface 260, either directly or through anti-spam controller 208.

User interface 230 is part of web browser 270 and include browser view 232, which can be a normal graphic user interface used by web browser 270. In addition to browser view 232, user interface 230 may also have a user feedback interface used to receive user feedback. For example, spam report button 234 is used for reporting newly found spam by user 235. A reported spam URL is received by spam reporter 212 which in turn reports to anti-spam server 292 on Internet 290. Anti-spam server 292 may consider updating its spam list 294 based on reported spam URLs. To be listed in the search engine's spam list 294, reported spam URLs may be further analyzed, either automatically or manually, to verify their spamming nature.

The search engine's spam list 294 may typically contain millions of URLs. Although it is possible for anti-spam tool 200 to directly access the search engine's spam list 294 hosted by anti-spam server 292, in the embodiment shown in FIG. 2 the spam list 294 is first downloaded from anti-spam server 292, stored as local spam list 282 at storage 280 to be more easily accessed by anti-spam tool 200. The storage 280 may be a local storage on the client machine (the computing device hosting web browser 270 and anti-spam tool 200), but may also be a network storage positioned on the same LAN as that of the computing device.

Anti-spam tool 200 further has a spam list indexer 210 which indexes spam list 282 into spam index 284 to further improve performance. Spam index 284 may be stored along with spam list 282 on storage 280 on the client machine. Typically, the search engine's spam list 294 is already indexed by the search engine, and accordingly anti-spam tool 200 may download an indexed spam list 282 to be used for reasonably fast anti-spam access. However, to optimize performance, a two-level indexing as described later with reference to FIG. 4 may be used.

FIG. 2 also shows data flows among the components. For example, original webpage is sent from Internet 290 to COM interface 260, subsequently to HTML loader 202, anti-spam operation module 204, HTML writer 206, and finally to browser view 232 to be viewed by user 235. Spam highlighted webpage and/or spam-deleted webpage are sent from anti-spam operation module 204 to HTML writer 206, and then to browser view 232 to be viewed by user 235. The search engine's spam list 294 is downloaded from anti-spam server 292. The downloaded spam list is sent from spam list store 282 to spam list indexer 210 to be indexed. Indexed spam list (spam index) is then sent from spam list indexer 210 to spam index store 284 to be stored. Spam index is sent from spam index store 284 to anti-spam operation module 204 for link analysis, spam detection and page update. On the user feedback side, reported spam URL is sent from spam report button 234 to spam reporter 212, which then sends the reported spam URL to anti-spam servers 292 to be considered for updating the search engine's spam list 294.

Figure 3:
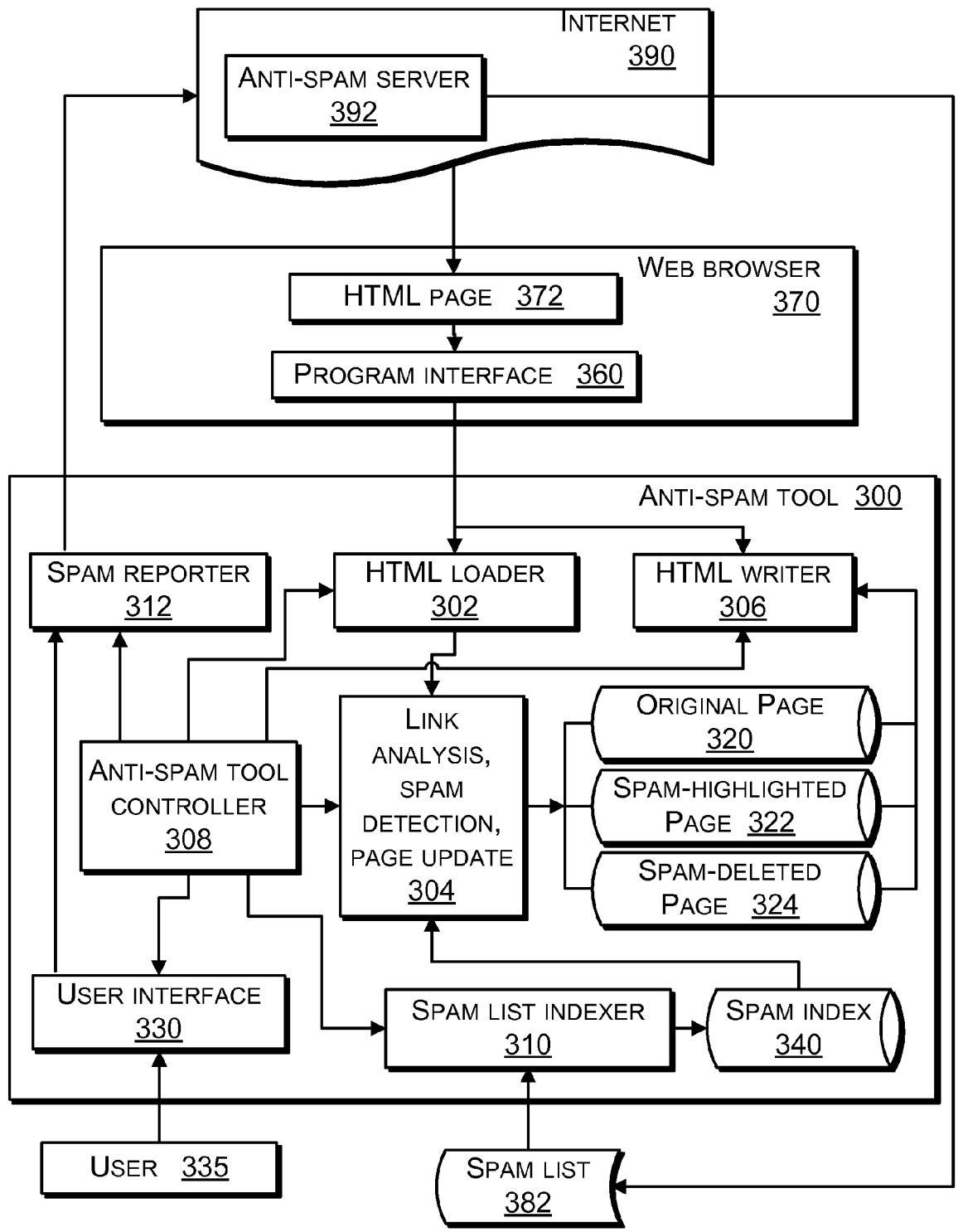
FIG. 3 illustrates a third exemplary embodiment of the anti-spam tool disclosed herein.

FIG. 3 illustrates a third exemplary embodiment of the anti-spam tool disclosed herein. Anti-spam tool 300 has a basic configuration similar to that of anti-spam tool 100 of FIG. 1. Although preferably anti-spam tool 300 is configured as an integral part or plug-in of web browser 370, it is possible to configure anti-spam tool 302 to be a separate unit used in parallel with web browser 370.

As shown in FIG. 3, anti-spam tool 300 is implemented in connection with web browser 370, interacting with web browser 370 through program interface 360, which can be a component of an API such as a Component Object Model (COM) interface. Anti-spam tool 300 includes the following basic components that are similar to the components in anti-spam tool 100: HTML loader 302 which calls functions in program interface 360 to load a webpage (e.g., HTML page 372) into web browser 370; anti-spam operation unit 304 which has several modules to perform anti-spam functions such as link analysis, spam detection and page update; anti-spam controller 308 which is the central controlling component of anti-spam tool 300; and HTML writer 306 which writes a webpage to be displayed by web browser 370.

Anti-spam operation unit 304 may have separate modules to perform individual anti-spam functions such as link analysis, spam detection and page update. Anti-spam operation unit 304 may output several different versions of HTML page 372, including original page 320, spam-highlighted page 322, and spam-deleted page 324. Of these different versions, original page 320 is essentially an unaltered copy of HTML page 372, spam-highlighted page 322 is an altered version of HTML page 372 with hyperlinks that point to a spam URL highlighted to bring user attention, and spam-deleted page 324 is an altered version of HTML page 372 with hyperlinks that point to a spam URL deleted. The output webpage from anti-spam operation unit 304 may be one or more of original page 320, spam-highlighted page 322 and spam-deleted page 324. HTML writer 306 receives the output webpages from anti-spam operation unit 304 and displays the webpages through user interface 330 to user 335. In one embodiment, user 335 is given an option to switch among original page 320, spam-highlighted page 322 and spam-deleted page 324. To write a webpage into user interface 330, HTML writer 306 calls functions in program interface 360, and may even write directly to user interface 330 or write through anti-spam tool controller 308.

User interface 330 is preferably a part of web browser 370 (e.g., a normal graphic user interface used by web browser 370), but may also be a separate user interface customized for anti-spam tool 300. User interface 330 also has a user feedback interface used to receive user feedback. A reported spam URL is received by spam reporter 312 which in turn reports to anti-spam server 392 on Internet 390. Anti-spam server 392 may consider updating its spam list 394 based on reported spam URLs.

The search engine's spam list is first downloaded from anti-spam server 392, stored as local spam list 382 to be more easily accessed by anti-spam tool 300. Anti-spam tool 300 further has a spam list indexer 310 which indexes spam list 382 into spam index 340 to further improve performance. Spam index 340 may be stored along with spam list 382 an storage in the client machine, but may also be at least partially loaded to a memory to be directly accessible by anti-spam tool 300. To optimize performance, a two-level indexing as described herein with reference to FIG. 4 may be used.

Figure 4:
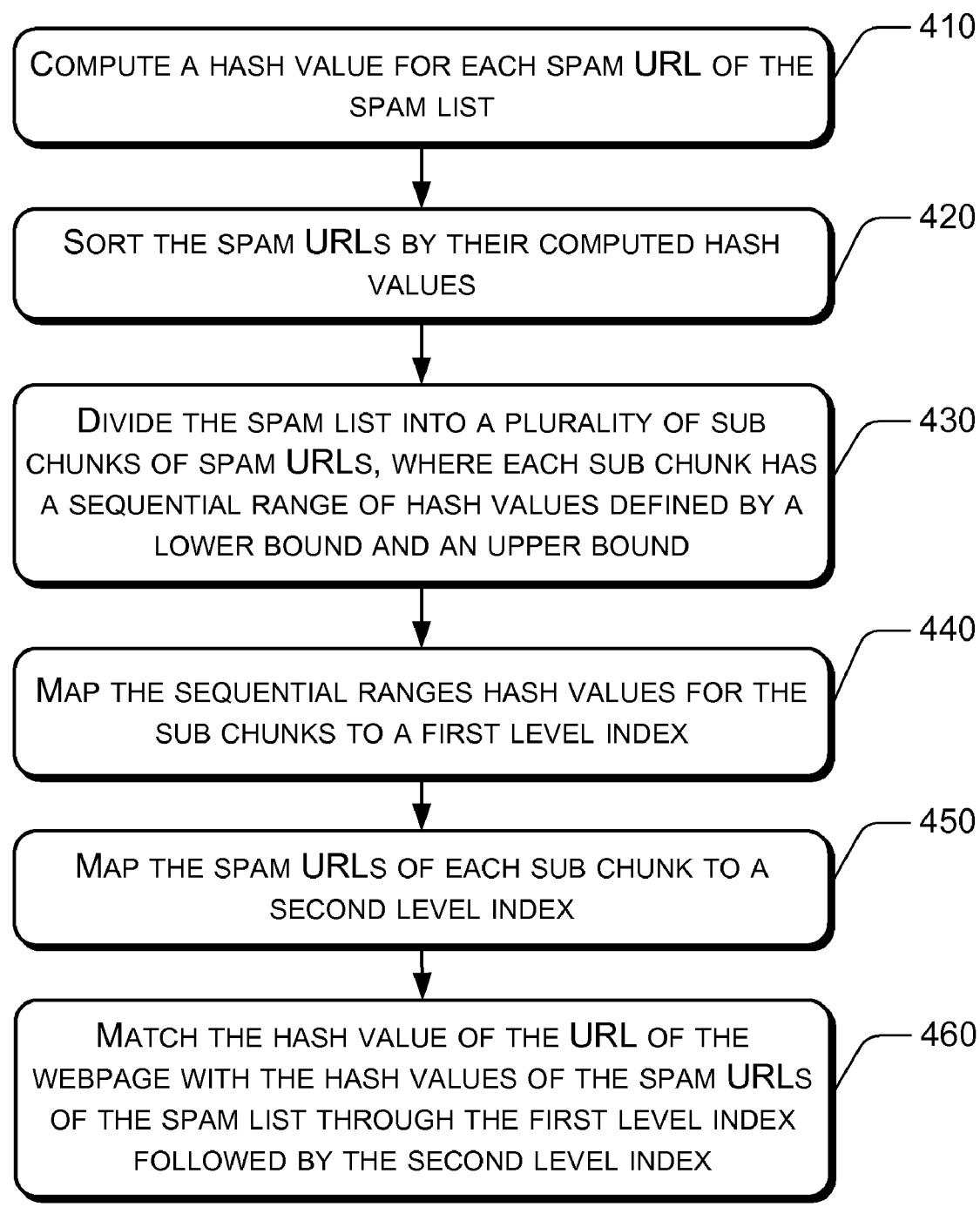
FIG. 4 is a flowchart of an exemplary process of the two-level indexing method used in the anti-spam tool.

FIG. 4 is a flowchart of an exemplary process of the two-level indexing method used in the anti-spam tool. In this description, the order in which a process is described is not intended to be construed as a limitation, and any number of the described process blocks may be combined in any order to implement the method, or an alternate method.

The spam list generated by the spam detectors of the search engine usually contains millions of URLs. The size of the spam list may pose a challenge for the local machine to perform a URL matching operation. To make the URL matching operation efficient, an exemplary process of FIG. 4 may be used.

At blocked 410, a hash value for each spam URL of the spam list is computed. Typically, hash values of spam URLs of the spam list have already been computed and indexed by the search engine. These hash values may be used here, so the client machine may not need to compute them again. However, if desired, new hash values for spam URLs may be computed using a different hash function. Such computation may be done either by a remote network computer, or locally by the client machine.

Block 420 sorts the spam URLs by their computed hash values.

Block 430 divides the spam list into a plurality of sub chunks of spam URLs. Each sub chunk has a sequential range of hash values defined by a lower bound and an upper bound. For example, sub chunks may be formed from the smallest to the biggest according to their integer codes, each sub chunk having no more than ten thousand URLs.

Block 440 maps the sequential ranges of the hash values for the sub chunks to a first level index. To do this, a suitable hash function may be used to generate hash values which are used as the first level index. In this mapping operation, each sub chunk of spam URLs is a data entity, and the corresponding sequential range of the hash values of the sub chunk is the key to the data entity. Each key is transformed using the selected hash function into a corresponding hash value, which is used as a first level index number to form a hash table or hash map for quick lookup. Using the first level index, the lookup is performed to match a certain hash value of a webpage with one of the sub chunks of spam URLs. It is thus a quick rough lookup.

Block 450 maps the individual spam URLs of each sub chunk to a second level index. In this mapping operation, each spam URL is mapped to a corresponding hash value. In a simple implementation, the hash values computed or obtained at block 410 may be used for this purpose. In one embodiment, for example, the search engine's spam list is updated periodically by downloading the latest index update information to the client machine. The downloaded index file may be kept, and only incrementally modified according to subsequently updated spam list files. If a URL in the old spam list is removed, for example, the corresponding record will also be removed from a chunk file in the second level index. If a new URL is added in the spam list, the anti-spam tool will compute the hash value of the new URL, find the chunk file to which the hash value should belong, and insert the hash value into the chunk file.

However, instead of using the hash values in the index downloaded from the search engine, a new hash function may be designed as a second level index function for each sub chunk to compute new hash values for the spam URLs in the respective sub chunk. The new hash values computed are then used to map the spam URLs of the respective chunk. The new hash function may be specially designed to help achieve certain goals, such as reducing the size of the index files and speeding up the index lookup during matching. The new hash function may or may not be the same for different sub chunks. Furthermore, the new hash function for the second level index may be different from the hash function used for the first level index. However, for simplicity, the same hash function used for the first-level index (block 440) may be used as the hash function for second level indexes.

Block 460 matches the hash value of the URL of the webpage being analyzed with the hash values of the spam URLs of the spam list through the first level index followed by the second level index. That is, the URL of the webpage being analyzed (e.g., HTML page 372 or hyperlinks contained therein) is first identified with a proper sub chunk of the spam URLs using the first level index, and then identified with a specific spam URL in the sub chunk. This two-level index method helps to realize rapid spam detection on a client machine. For example, when the anti-spam tool is running, it may load the first level index into memory while leave the second level index on the storage. When capturing a URL from the opened page (e.g., HTML page 372), the anti-spam tool computes the hash value (e.g., an integer code) and match the hash value to the spam list through the two-level index to judge whether the opened page is a spam page according to the spam list detected by the search engine. The same spam detection process may be applied to a URL linked by a hyperlink on the opened page.

Figure 5:
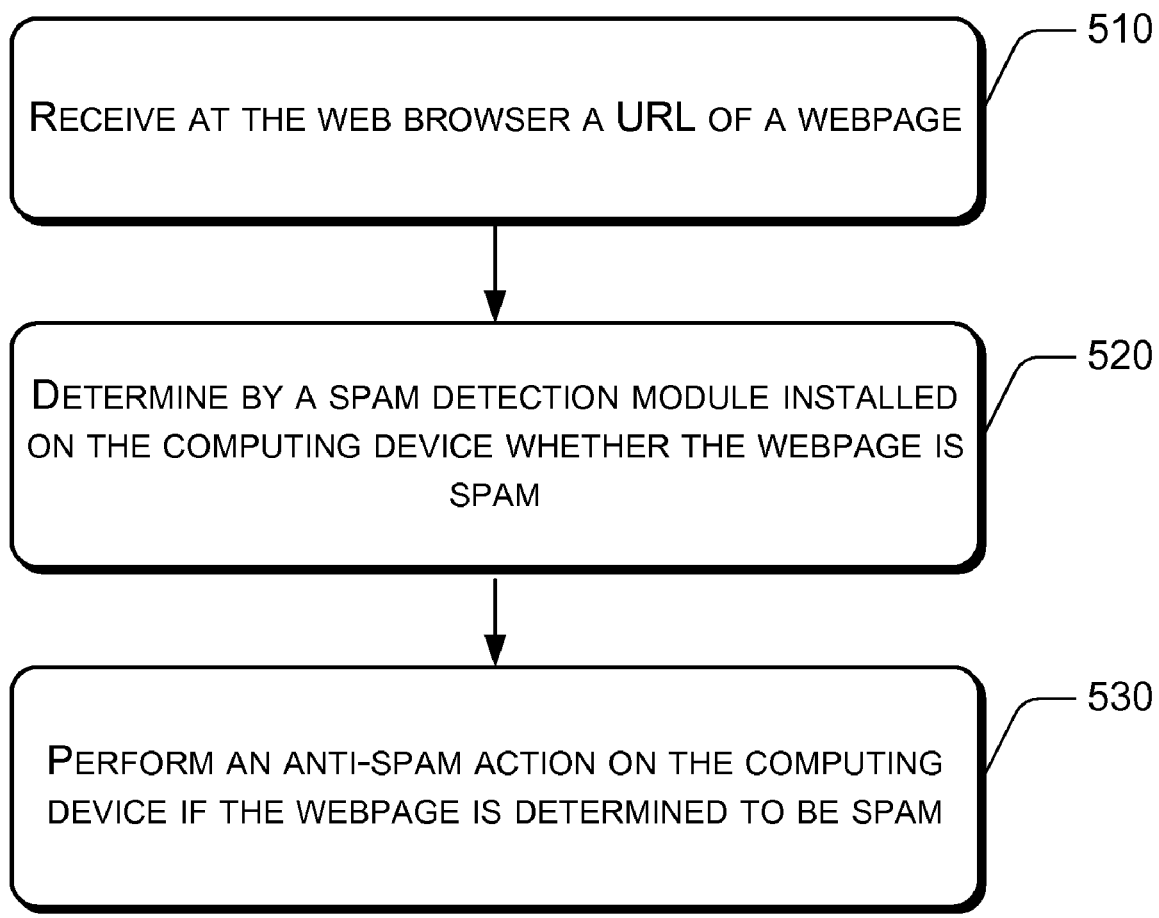
FIG. 5 is a flowchart of an exemplary anti-spam method using the anti-spam tool described herein.

FIG. 5 is a flowchart of an exemplary anti-spam method using the anti-spam tool described herein. The method is used for resisting spam webpages on a computing device installed with a web browser. The overall process of the exemplary anti-spam method may be summarized in the following three major steps.

At block 510, the anti-spam tool receives at the web browser a URL of a webpage. The URL of the webpage received may be the URL of the webpage that is being currently accessed by the web browser. In this case, the anti-spam tool receives the URL of the webpage by directly detecting the URL that is being accessed by the web browser. Alternatively, the URL of the webpage received may be the URL of a hyperlink contained in a parent webpage that is being opened by the web browser. In this case, the anti-spam tool receives the URL of the page by analyzing the hyperlink.

In one embodiment, the anti-spam tool is embodied as a toolbar on web browser. When a user opens a webpage, the toolbar captures the content of the webpage by COM Interface of the web browser. The toolbar extracts the URL of the webpage and the URLs contained in the webpage.

At block 520, the anti-spam tool determines using a spam detection module installed on the computing device whether the webpage is spam. For example, the anti-spam tool (e.g., embodied as a web browser toolbar) searches in the latest big spam list index stored in the computing device (the client machine) to judge whether the webpage is spam.

At block 530, the anti-spam tool performs an anti-spam action on the computing device if the webpage is determined to be spam. For example, if the opened page is spam, the anti-spam tool will send out a warning message to the user. If it is determined that there are spam URLs contained in the page, the tool may generate and store several different versions of the page including (a) the original version; (b) a modified version by highlighting the spam URLs; and (c) a modified version by deleting the spam URLs. If the anti-spam tool is implemented as a toolbar in the browser, the user can use a button in the toolbar to switch between the different versions of the page. The user can also use another button in the toolbar to report the spam pages he/she finds to the search engine.

Implementation Environment

The above-described techniques may be implemented with the help of a computing device, such as a server, a personal computer (PC) or a portable device having a computing unit.

Figure 6:
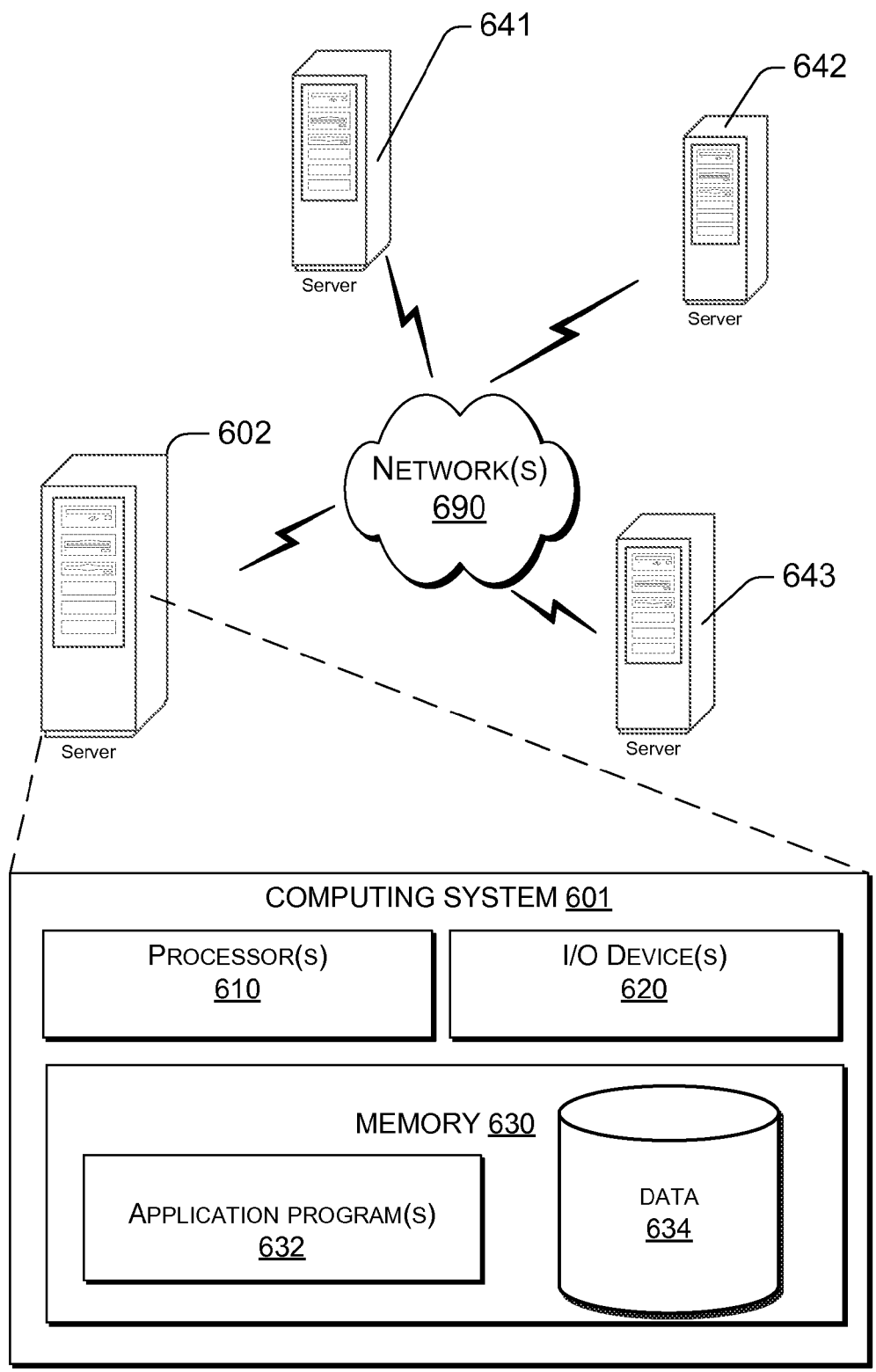
FIG. 6 shows an exemplary environment for implementing the method of the present disclosure.

FIG. 6 shows an exemplary environment for implementing the method of the present disclosure. Computing system 601 is implemented with computing device 602 which includes processor(s) 610, I/O devices 620, computer readable media (e.g., memory) 630, and network interface (not shown). The computer device 602 is connected to servers 641, 642 and 643 through networks 690.

The computer readable media 630 stores application program modules 632 and data 634 (such as spam index data). Application program modules 632 contain instructions which, when executed by processor(s) 610, cause the processor(s) 610 to perform actions of a process described herein (e.g., the processes of FIGS. 1-2).

For example, in one embodiment, computing system 601 has installed the upon a web browser, such as Internet Explorer. Computer readable medium 630 has stored thereupon a plurality of instructions that, when executed by one or more processors 610, causes the processor(s) 610 to:

(i) receive at the web browser URL of a webpage;

(ii) determine by a spam detection module installed on the computing device 601 whether the webpage is spam; and (iii) perform an anti-spam action on the computing device 601 if the webpage is determined to be spam.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Conclusion

An anti-spam tool for web browser, such as a toolbar for Windows Internet Explorer, has been described. The anti-spam tool can help users find and remove spam pages on a client machine (such as a PC) in regular web browsing contexts not limited to webpage accesses through a search engine.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for resisting spam webpages on a computing device installed with a web browser, the method comprising:
    receiving at the web browser a URL of a webpage;
    determining by a spam detection module installed on the computing device whether the webpage is spam by comparing the URL of the webpage with a spam list including spam URLs, the spam list being created by:
        dividing the spam URLs of the spam list into a plurality of sub chunks of spam URLs;
        indexing the spam URLs into a first level index and a second level index, the first level index maps a first set of hash values to ranges of sub chunks of spam URLs, and the second level index maps a second set of hash values to the remaining sub chunks of spam URLs in the plurality of sub chunks;
        the first set of hash values are created using a first hash function and the second set of hash values are created using a second hash function; and
    performing an anti-spam action on the computing device if the webpage is determined to be spam;
    wherein comparing the URL of the webpage with the spam comprises:
        computing a hash value for the URL of the webpage using a hash function; and
        matching the hash value of the webpage with the set of hash values of the spam URLs;
    wherein the spam list is further created by:
        computing the first set of hash values and the second set of hash values;
        sorting the spam URLs by their computed hash values;
    wherein each sub chunk having a sequential range of hash values defined by a lower bound and an upper bound.

2. The method as recited in claim 1, wherein at least part of the spam list is accessible locally by the computing device.

3. The method as recited in claim 1, wherein the spam list is downloaded from a remote server.

4. The method as recited in claim 1, further comprising:
    loading the first level index into a memory of the computing device.

5. The method as recited in claim 1, wherein the first level index is loaded to a memory of the computing device during execution of the method.

6. The method as recited in claim 1, wherein receiving the URL of the webpage comprises detecting the URL of the webpage that is being currently accessed by the web browser.

7. The method as recited in claim 1, wherein receiving the URL of the webpage comprises determining if the URL as a link contained in a parent webpage that is being opened by the web browser is a spam URL.

8. The method as recited in claim 1, wherein performing an anti-spam action comprises performing one or more of the following actions: blocking the webpage, displaying a warning against opening the webpage, highlighting a link to the webpage, and removing any links to the webpage from a parent webpage that is being opened by the web browser.

9. An anti-spam tool executable by a processor, wherein the anti-spam tool is embodied on computer-readable memory and co-installed with a web browser on a computing device, and interfaces with the web browser through a program interface, the anti-spam tool comprising:
    a spam detection module determines whether a target webpage associated with a URL is spam;
    receiving at the web browser a URL of a webpaqe;
    determining by a spam detection module installed on the computing device whether the webpaqe is spam by comparing the URL of the webpaqe with a spam list including spam URLs, the spam list being created by:
        dividing the spam URLs of the spam list into a plurality of sub chunks of spam URLs;
        indexing the spam URLs into a first level index and a second level index, the first level index maps a first set of hash values to ranges of sub chunks of spam URLs, and the second level index maps a second set of hash values to the remaining sub chunks of spam URLs in the plurality of sub chunks;
        the first set of hash values are created using a first hash function and the second set of hash values are created using a second hash function; and
    performing an anti-spam action on the computing device if the webpage is determined to be spam;
    wherein comparing the URL of the webpage with the spam comprises:
        computing a hash value for the URL of the webpage using a hash function; and
        matching the hash value of the webpage with the set of hash values of the spam URLs;
    wherein the spam list is further created by:
        computing the first set of hash values and the second set of hash values;
        sorting the spam URLs by their computed hash values;
    wherein each sub chunk having a sequential range of hash values defined by a lower bound and an upper bound;
    a spam list indexer comprising an index of a spam list, the index including a plurality of groups that each include a plurality of spam URLs, wherein at least one group is assigned a hash value; and
    an anti-spam controller assist performs an anti-spam action if the target webpage is determined to be a spam.

10. The anti-spam tool as recited in claim 9, wherein the spam detection module determines whether the webpage is spam by comparing the URL of the webpage with a spam list which is stored at least partly on the computing device.

11. The anti-spam tool as recited in claim 9, further comprising a user interface receives a user feedback containing spam report information.

12. The anti-spam tool as recited in claim 9, wherein the anti-spam action comprises one or more of the following actions: blocking the webpage, displaying a warning against opening the webpage, highlighting a link to the webpage, and removing any links to the webpage from a parent webpage that is being opened by the web browser.

13. The anti-spam tool as recited in claim 9, further comprising a page update module modifies a webpage to be displayed according to the anti-spam action performed.

14. The anti-spam tool as recited in claim 9, comprising an anti-spam plug-in module added on to the web browser.

15. The anti-spam tool as recited in claim 9, the anti-spam tool being installed as a plug-in module in the web browser and, when executed by the processor, manifesting a user interactive toolbar function on the web browser.

16. One or more computer readable memory having stored thereupon a plurality of instructions that, when executed by a processor, causes the processor to implement the instructions for a method comprising:
  receiving at the web browser a URL of a webpaqe;
  determining by a spam detection module installed on the computing device whether the webpaqe is spam by comparing the URL of the webpaqe with a spam list including spam URLs, the spam list being created by:
    dividing the spam URLs of the spam list into a plurality of sub chunks of spam URLs;
    indexing the spam URLs into a first level index and a second level index, the first level index maps a first set of hash values to ranges of sub chunks of spam URLs, and the second level index maps a second set of hash values to the remaining sub chunks of spam URLs in the plurality of sub chunks;
    the first set of hash values are created using a first hash function and the second set of hash values are created using a second hash function; and
  performing an anti-spam action on the computing device if the webpaqe is determined to be spam;
  wherein comparing the URL of the webpaqe with the spam comprises:
    computing a hash value for the URL of the webpaqe using a hash function; and
    matching the hash value of the webpage with the set of hash values of the spam URLs;
  wherein the spam list is further created by:
    computing the first set of hash values and the second set of hash values;
    sorting the spam URLs by their computed hash values;
  wherein each sub chunk having a sequential range of hash values defined by a lower bound and an upper bound;
    dividing a plurality of spam uniform resource locators (URLs) into a plurality of sub chunks of spam URLs;
    indexing the spam URLs into a first level index and a second level index, the first level index maps a first set of hash values to ranges of sub chunks of spam URLs, and the second level index maps a second set of hash values to the remaining sub chunks of spam URLs in the plurality of sub chunks;
    matching the hash value of the URL of the webpage with the hash values of the spam URLs of the spam list through the first level index followed by the second level index.

* * * * *